US008982840B2

(12) United States Patent
Zisimopoulos et al.

(10) Patent No.: US 8,982,840 B2
(45) Date of Patent: Mar. 17, 2015

(54) HANDOVER

(75) Inventors: Haris Zisimopoulos, London (GB);
Vaishali Paisal, Byrasandra (IN); Ricky Kaura, Uxbridge (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/643,172

(22) PCT Filed: Apr. 27, 2011

(86) PCT No.: PCT/KR2011/003109
§ 371 (c)(1),
(2), (4) Date: Oct. 24, 2012

(87) PCT Pub. No.: WO2011/136569
PCT Pub. Date: Nov. 3, 2011

(65) Prior Publication Data
US 2013/0045743 A1 Feb. 21, 2013

(30) Foreign Application Priority Data
Apr. 27, 2010 (IN) .......................... 1172/CHE/2010

(51) Int. Cl.
H04W 4/00 (2009.01)
H04W 36/14 (2009.01)
H04W 36/00 (2009.01)
H04W 36/28 (2009.01)

(52) U.S. Cl.
CPC .......... *H04W 36/14* (2013.01); *H04W 36/0027* (2013.01); *H04W 36/28* (2013.01)
USPC ............................. 370/331; 370/332; 455/436

(58) Field of Classification Search
None
See application file for complete search history.

(56) References Cited

U.S. PATENT DOCUMENTS

| 8,270,372 | B2* | 9/2012 | Wu ................................ 370/331 |
| 8,565,772 | B2* | 10/2013 | Bae et al. ....................... 455/439 |
| 2005/0180338 | A1 | 8/2005 | Pirila et al. |
| 2007/0058791 | A1* | 3/2007 | Liu et al. .................... 379/88.17 |
| 2008/0267128 | A1* | 10/2008 | Bennett et al. ................. 370/331 |
| 2009/0086674 | A1* | 4/2009 | Ejzak ............................. 370/331 |
| 2009/0257433 | A1* | 10/2009 | Mutikainen et al. .......... 370/392 |
| 2010/0034168 | A1 | 2/2010 | Mahdi |
| 2010/0040020 | A1* | 2/2010 | Chen ............................. 370/331 |
| 2010/0142488 | A1* | 6/2010 | Zhang et al. .................. 370/332 |
| 2010/0250753 | A1* | 9/2010 | Song et al. .................... 709/227 |
| 2010/0260105 | A1* | 10/2010 | Keller et al. .................. 370/328 |
| 2011/0032906 | A1* | 2/2011 | Mutikainen et al. .......... 370/331 |
| 2011/0110326 | A1* | 5/2011 | Rexhepi et al. ............... 370/331 |

(Continued)

*Primary Examiner* — Magdi Elhag
(74) *Attorney, Agent, or Firm* — Jefferson IP Law, LLP

(57) ABSTRACT

An improvements to Handover is provided. User equipment capable of participating in the handover of communications instances from a first radio access network to a second radio access network, the first radio access network being capable of supporting packet switched communications and the second radio access network being capable of supporting circuit switched communications is adapted to participate in a first voice-and-multimedia communications session in said first radio access network, as part of a communications instance, during handover of said communications instance from said first radio access network to said second radio access network, transfer a voice communications session, to continue said communications instance, and responsive to said handover, send a first message to a node of said second radio access network to provide a second voice-and-multimedia communications session in said second radio access network, to further continue said communications instance.

34 Claims, 3 Drawing Sheets

(56) References Cited

U.S. PATENT DOCUMENTS

| | | | |
|---|---|---|---|
| 2011/0206010 A1* | 8/2011 | Keller et al. | 370/331 |
| 2011/0249652 A1* | 10/2011 | Keller et al. | 370/331 |
| 2012/0081505 A1* | 4/2012 | Long et al. | 348/14.11 |
| 2012/0113982 A1* | 5/2012 | Akselin et al. | 370/355 |
| 2012/0120914 A1* | 5/2012 | Sedlacek et al. | 370/331 |
| 2012/0207127 A1* | 8/2012 | Xie | 370/331 |
| 2012/0224564 A1* | 9/2012 | Paisal et al. | 370/331 |
| 2012/0269164 A1* | 10/2012 | Xie | 370/331 |
| 2013/0063540 A1* | 3/2013 | Zisimopoulos et al. | 348/14.02 |
| 2013/0143565 A1* | 6/2013 | Zisimopoulos et al. | 455/436 |
| 2013/0195074 A1* | 8/2013 | Keller et al. | 370/331 |

* cited by examiner

HANDOVER

TECHNICAL FIELD

The present invention relates generally to wireless networks, and more specifically to a method and apparatus for improving handover of user equipment between a first radio access network and a second radio access network.

BACKGROUND ART

Wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

Note that the term "GERA" is used herein to refer to the radio access technology associated with GERAN (GERA networks), "UTRA" is used to refer to the radio access technology associated with UTRAN (UTRA networks), and similarly the term "E-UTRA" or "LTE" is used to refer to the radio access technology associated with E-UTRAN (E-UTRA networks).

LTE is designed primarily as a high speed packet switched network, and voice services, packet switched voice services and in particular Voice over Internet Protocol Multimedia Subsystem (VoIMS) services are envisaged, whereas previous generation systems such as UMTS support voice services that are primarily circuit switched.

As new technology is introduced, networks are typically deployed which include radio access networks that use a radio access technology according to a recent standard and also legacy radio access networks that use a legacy radio access technology. A user equipment may be typically capable of communications using two or more radio access technologies, so for example the user equipment is able operate using one radio access technology, perhaps offering high capacity, where this is available, but being able to operate using a legacy radio access technology, in those service areas of the network that do not support the other radio access technology, or that do not support preferred features.

In service areas where a radio access network, such as an LTE/E-UTRA network, does not support voice communications, user equipment may follow a defined procedure to fall back to using another radio access network, such as UTRAN or GERAN, for voice communications, typically falling back to circuit switched voice communications.

There are a variety of handover procedures that have been developed to allow handover of user equipment between a E-UTRA network and a UTRA/GERA network. In particular, handover procedures have been developed to allow handover when a voice call is in progress, that is to say so-called Voice Call Continuity (VCC) handover procedures. Typically a VCC procedure will be implemented under the control of a session transfer controller, which will typically comprise a Service Centralisation and Continuity Application Server (SCC AS) and a Proxy Call Session Control Function, a Serving Call Session Control Function and/or Interrogating Call Session Control function (P/I/S-CSCF). The session transfer controller is typically implemented in the Internet Protocol Multimedia Subsystem (IMS).

The IMS is typically used to control packet switched services offered over the E-UTRA network; control of circuit switched services in a UTRA/GERA network typically involves a mobility controller, such as a Mobility Switching Centre (MSC). The session transfer controller typically communicates with the mobility controller during handover according to a VCC procedure.

User equipment may be equipped with a single radio transceiver, for reasons of economy or for minimising power consumption, so that simultaneous communications with two radio access networks is not possible. In this case the handover protocol typically uses a break-before-make radio connection during handover. Handover procedures known as Single Radio Voice Call Continuity (SR VCC) procedures have been developed for such situations.

In an arrangement, such as where a video or multimedia call is handed over utilizing SRVCC from a packet based network to a circuit based network, the video or multimedia call maybe scaled back to a voice call, i.e. only a voice component of the video or the multimedia call is transferred from the packet based network to the circuit based network.

A circuit switched multimedia service with service change and fallback, SCUDIF, Service Change and UDI/RDI Fallback (SCUDIF) is known and described in 3GPP TS 23.172 V6.3.0 (2005-06): UDI/RDI fallback and service modification, Stage 2. UDI stands for unrestricted digital information, RDI for restricted digital information. UDI/RDI is part of Bearer Capability information passed to/from the network.

SCUDIF allows users to achieve successful call establishment when end to end circuit-switched multimedia call is not possible or when signaling of the feature is not possible in the network. Furthermore, SCUDIF allows the users to swap between a multimedia service and basic speech during an established call.

For video calls initiated in a circuit switched domain, SCUDIF supports the following fallback and change features:

a) fallback to speech during call setup: allow a user to attempt to set up a multimedia call, and try a speech connection if the former doesn't succeed;

b) fallback to the less preferred service (speech or multimedia) during call setup: allow the terminating side via specific settings for this service in the terminal to accept or reject a multimedia call, without interrupting the call setup;

c) fallback to the preferred service (speech or multimedia) or speech during call setup: allow the call setup to proceed with a single service if the transit network does not support the signaling of this functionality;

d) bearer capability (BC) negotiation at the terminating side: allow the terminating side via specific settings for this service in the terminal to turn a speech call (with service change) into a multimedia call and vice-versa;

e) service change: allow a speech call to be turned to multimedia by either of parties, and back to speech, through a successful in call modification procedure;

f) allow any of the users associated with a communications session to reject a multimedia request from the other party while in speech mode and g) network-initiated service change: the network shall initiate a service-change from multimedia to speech during the active call if a multimedia call can no longer be supported, and if the multimedia call can again be supported at a later point in time, the network may initiate a service change from speech to multimedia.

DISCLOSURE OF INVENTION

Technical Problem

In an arrangement, such as where a voice-and-multimedia, for example voice-and-video communications session established in a packet switched network is handed over utilizing SRVCC to a circuit switched network, there may be no capability negotiation between user equipment and the circuit switched network. In such arrangements, the user equipment and the circuit switched network would unaware of each other's SCUDIF compatibility.

There is therefore no means of restoring multimedia capabilities of a voice-and-multimedia call that has been transferred from the packet switched network to the circuit switched network, other than by the user ending the call and establishing a new voice-and-multimedia call in the circuit switched network.

Solution to Problem

In accordance with a first aspect of the present invention, there is provided a user equipment capable of handling voice communications sessions and voice-and-multimedia communications sessions and of participating in the handover of communications instances from a first radio access network to a second radio access network, the first radio access network being capable of supporting packet switched communications and the second radio access network being capable of supporting circuit switched communications, the user equipment being adapted to:

participate in a first voice-and-multimedia communications session in said first radio access network, as part of a communications instance;

during handover of said communications instance from said first radio access network to said second radio access network, transfer a voice communications session, to continue said communications instance; and responsive to said handover, send a first message to a node of said second radio access network to provide a second voice-and-multimedia communications session in said second radio access network, to further continue said communications instance.

An advantage of sending the first message in response to a handover leading a voice-and-multimedia communications session, for example a voice-and-video communications session, reducing to a voice communications session, is that it provides a means for the user equipment to restore the multimedia capabilities of such a voice-and-multimedia communications session that was reduced to a voice communications session. Therefore, the invention enables restoration of multimedia capabilities of a voice-and-multimedia communications instance, which have been affected by handover of user equipment from a packet switched network to a circuit switched network, by the user equipment.

Preferably, the user equipment is adapted to trigger sending of the first message in response to receiving a predetermined message from the second radio access network, the predetermined message comprising instructions relating to said handover.

Preferably, the user equipment is adapted to trigger sending of the first message in response to sending a further predetermined message to the second radio access network, the further predetermined message indicating completion of said handover.

Preferably, the further predetermined message is a Single Radio Voice Call Continuity (SRVCC) handover complete message.

Preferably, the user equipment is adapted to trigger sending of the first message without user intervention.

Preferably, the first message comprises a predefined Session Transfer Number (STN).

Preferably, a Session Transfer Number Single Radio (STN-SR) is the STN of the first message, the STN-SR being received during the transfer of said voice communications session.

Preferably, the user equipment is adapted to simultaneously participate in said voice communications session and said second voice-and-multimedia communications session in said second radio access network.

Preferably, the user equipment is adapted to terminate said voice communications session in response to said second voice-and-multimedia communications session being established in said second radio access network.

Preferably, the user equipment has a single radio interface for communicating with the first wireless network and the second wireless network, such that a radio connection with the first wireless network must be broken before a radio connection with the second wireless network is made when participating in said handover.

Preferably, the handover comprises SRVCC procedures.

Preferably, sending of the first message causes the node to assess the second radio access network's capability of supporting the second voice-and-multimedia communications session, and in the event that the second voice-and-multimedia communications session is compatible with the capability of the second radio access network, the node to transmit a second message requesting establishment of the second voice-and-multimedia communications session to a session transfer controller.

Preferably, in the event that the second voice-and-multimedia communications session is incompatible with the capability of the second radio access network, the user equipment abandons establishment of the second voice-and-multimedia communications session, to continue said communications instance.

Preferably, the establishment of the second voice-and-multimedia communications session comprises Service Change for UDI Fallback (SCUDIF) procedures.

Preferably, said first message comprises at least two bearer capability parameters indicating at least two requested session types, the session type being a B channel.

Preferably, said first message comprises a repeat indicator (RI) indicating allowability of changes between at least two requested session types during provisioning of said second voice-and-multimedia communications session.

Preferably, the second radio access network's capability of supporting the second voice-and-multimedia communications session is determined on the basis of the at least two bearer capability parameters in the first message.

In accordance with a second aspect of the present invention, there is provided a session transfer controller capable of assisting transfer of a communications instance after handover of user equipment from a first radio access network to a second radio access network, the first radio access network being capable of supporting packet switched communications and the second radio access network being capable of supporting circuit switched communications, and the second radio access network being capable of communications with the session transfer controller, wherein before handover of the user equipment, the user equipment participates in a first voice-and-multimedia communications session in said first radio access network, as part of a communications instance, the session transfer controller being arranged to:

after handover of a communications instance from said first radio access network to said second radio access network which transfers a voice communications session in said second radio access network, provide a second voice-and-multimedia communications session in said second radio access network to continue said communications instance.

Providing the second voice-and-multimedia communications session enables restoration of multimedia capabilities of a multimedia call that has been reduced to a voice call, due to a handover of the user equipment between the packet switched network to the circuit switched network.

Preferably, said session transfer controller is adapted to correlate said second voice-and-multimedia communications session with said voice communications session to continue said communications instance.

Preferably, said correlation of said second voice-and-multimedia communications session with said voice communications session is performed on the basis of a Session Transfer Number (STN).

Preferably, said correlation is performed by assigning a STN of said voice communications session to said second voice-and-multimedia communications session.

Preferably, said correlation of said second voice-and-multimedia communications session with said voice communications session is performed on the basis of a Correlation Mobile Subscriber Integrated Services Digital Network Number (C-MSISDN) associated with the user equipment.

Preferably, the correlation relates said voice communications session and said second voice-and-multimedia communications session to a single communications session with further user equipment in said communications instance.

Preferably, said session transfer controller is adapted to establish said second voice-and-multimedia communications session in said second radio access network in response to a message from said user equipment.

Preferably, the session transfer controller is adapted to simultaneously control said voice communications session and said second voice-and-multimedia communications session in said second radio access network.

Preferably, the session transfer controller is adapted to terminate said voice communications session in response to said second voice-and-multimedia communications session being established in said second radio access network.

Preferably, the user equipment has a single radio interface for communicating with the first wireless network and the second wireless network, such that a radio connection with the first wireless network must be broken before a radio connection with the second wireless network is made when participating in said handover.

Preferably, the handover comprises Single Radio Voice Call Continuity (SRVCC) procedures.

Preferably, the establishment of the second voice-and-multimedia communications session comprises Service Change for UDI Fallback (SCUDIF) procedures.

Further features and advantages of the invention will be apparent form the following description of preferred embodiments of the invention, which are given by way of example only.

Advantageous Effects of Invention

An advantage of the present invention is that it provides a means for the user equipment to restore the multimedia capabilities of such a voice-and-multimedia communications session that was reduced to a voice communications session. Therefore, the present invention enables restoration of multimedia capabilities of a voice-and-multimedia communications instance, which have been affected by handover of user equipment from a packet switched network to a circuit switched network, by the user equipment.

MODE FOR THE INVENTION

By way of example an embodiment of the invention will now be described in the context of a telecommunications network including a radio access network supporting communications using E-UTRA/LTE radio access technology, as associated with E-UTRAN networks in LTE systems, supporting packet switched voice communications, and another radio access network supporting communications using GERA/UTRA radio access technology, as associated with GERAN/UTRAN networks in GSM/UMTS systems, supporting circuit switched voice communications. However, it will be understood that this is by way of example only and that other embodiments may involve wireless networks using other radio access technologies, such as IEEE802.16 WiMax systems; embodiments are not limited to the use of a particular radio access technology.

Initial deployments of E-UTRAN networks are typically within areas of coverage of existing wireless networks, such as legacy GERAN/UTRAN networks. On initial deployment, a E-UTRAN network provides service to a smaller geographical area than that covered by existing legacy networks, covering for example city centres, and the areas covered may not be contiguous. Furthermore, only a subset of the available network features may be enabled, and the enablement of features may not be uniform across the network. In particular, due to its potentially enhanced data capacity in comparison with legacy systems, initial deployments of E-UTRAN may concentrate on providing high bandwidth data services, for example to LTE enabled equipment such as personal digital assistants (PDAs) or to user equipment in the form of plug in communications modules for laptop computers. For this reason, the primary LTE voice service, a packet switched service known a Voice over IMS (VoIMS), may not be available in certain areas.

If the user equipment moves out of an area of coverage of an E-UTRAN network, then a handover to a GERAN/UTRAN network may be required, and the handover may be a Single Radio Voice Call Continuity (SRVCC) handover.

Figure 1:
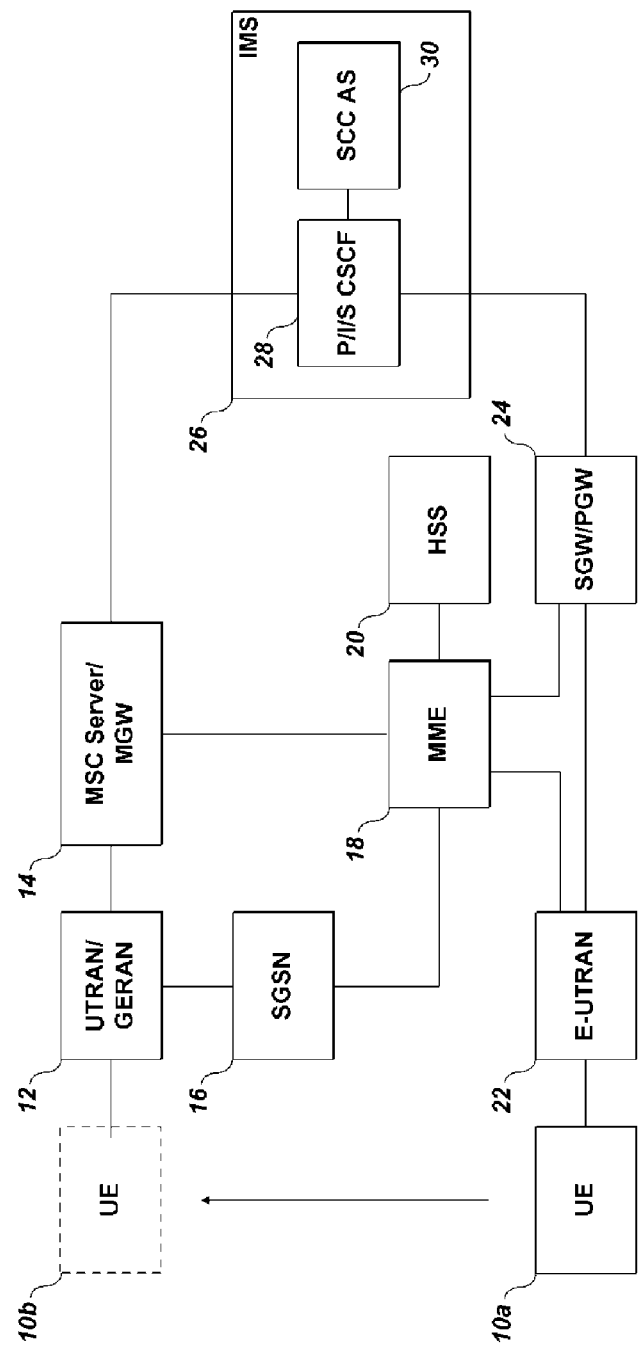
FIG. 1 is a schematic diagram showing signalling paths in telecommunications network in support of SRVCC handover.

FIG. 1 shows signalling paths in a telecommunications network in support of SRVCC handover. A user equipment (UE) 10 is connected to a first radio access network, being in this example a E-UTRAN radio access network 22, and handover is required to a second radio access network, in this example a UTRAN/GERAN radio access network 12, so that the user equipment, on handover to the second radio access network, is connected to the UTRAN/GERAN radio access network 12.

The first radio access network has a Mobile Management Entity (MME) 18, which is connected to a Home Subscriber Server (HSS) 20 and a Serving GateWay/Packet GateWay (SGW/PGW) 24, which acts in support of handover within E-UTRAN. An Internet Protocol Multimedia subsystem (IMS) 26 is capable of communications with the first radio access network via the SGW/PGW 24 and with the second radio access network via the MSC 14.

The second radio access network has a mobility controller, in this example the Mobile Switching Centre (MSC) server 14. A Media Gateway (MGW) 14 may also be utilised to enable media communications between the E-UTRAN 22 and the UTRAN/GERAN 12. The second radio access network also has a Serving General Packet Radio Service Support Node (SGSN) 16, which has a connection to the MME 18.

The IMS 26 comprises a session transfer controller, which in this example comprises a Service Centralisation and Continuity Application Server (SCC AS) 30 and a Proxy Call Session Control Function, a Serving Call Session Control Function and/or Interrogating Call Session Control function (P/I/S-CSCF) 28.

Figure 2:
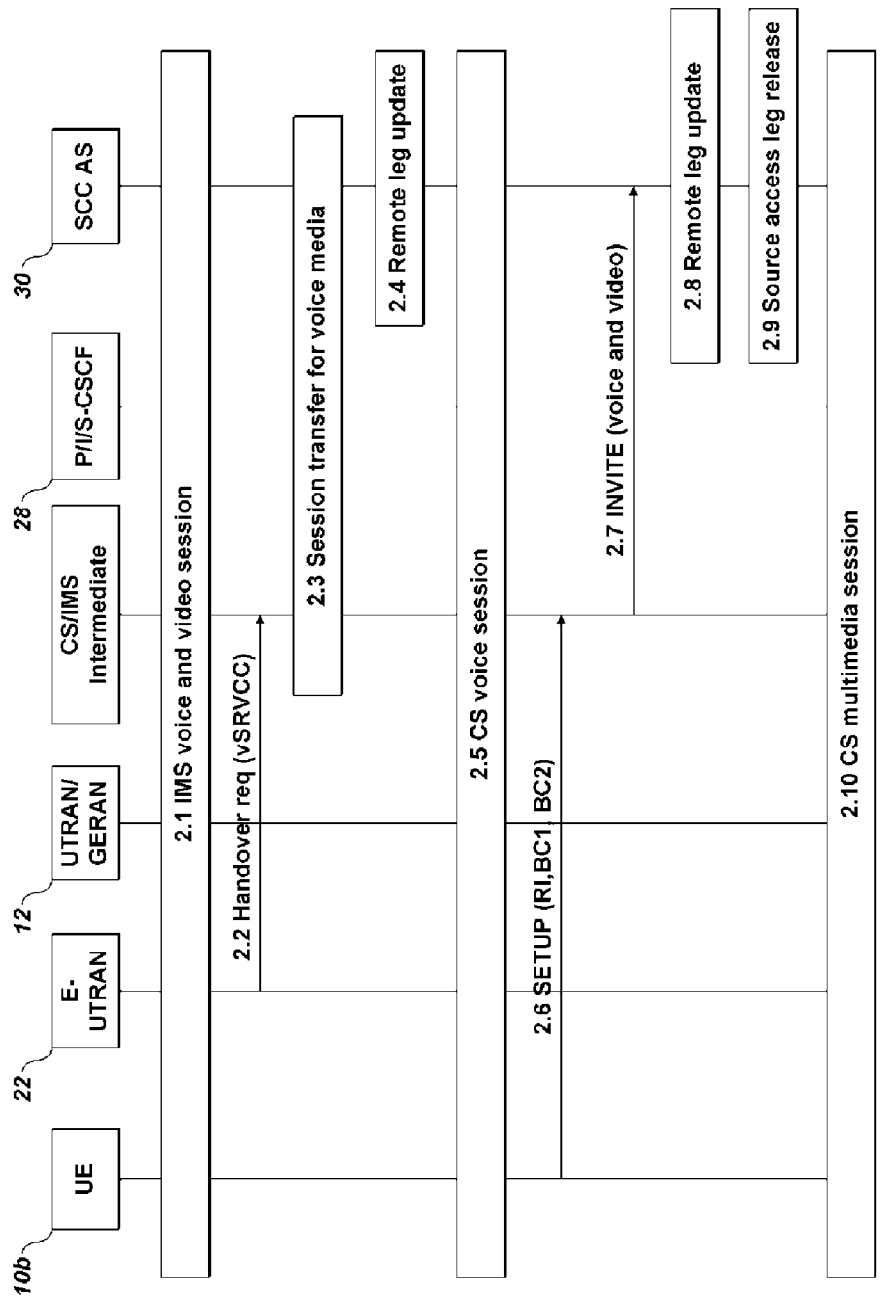
FIG. 2 is a schematic diagram illustrating an embodiment of the invention.

An arrangement for transferring a multimedia communications instance from a packet switched network, such as the E-UTRAN 22, to a circuit switched network, such as the UTRAN 12 or the GERAN 12, will now illustrated with reference to FIG. 2. At step 2.1, the UE 10 is located the E-UTRAN 22, and has at least one active voice-and-multimedia communications session, or at least one active voice-and-multimedia communications session, for example a voice-and-video communications session. As will be appreciated, an active voice-and-multimedia communications session, to which the UE 10 is a party to, can be initiated by the UE 10 or joined by the UE 10 in response to an invitation to join a given voice-and-multimedia communications session. It should be understood that multimedia communications may comprise video, still image and/or or text communications.

A handover is triggered to transfer the UE 10 from the E-UTRAN 22 to the UTRAN/GERAN 12, at step 2.2. As will be appreciated, the handover may be triggered by the E-UTRAN 22, the UE 10 or both. The decision to trigger the handover is based on at least one predetermined criteria, such as the signal strength measurements at the UE 10. In the event that the criteria for transferring at least one active voice-and-multimedia communications sessions on the UE 10 are met, the E-UTRAN triggers the handover. Since the at least one active voice-and-multimedia communications session is being handed over from a first radio access network capable of supporting packet switched communications, the E-UTRAN 22, to a second radio access network capable of supporting circuit switched communications, the UTRAN/GERAN 12, the E-UTRAN 22 triggers a Single Radio Voice Call Continuity (SRVCC) handover. The SRVCC handover procedure has been described in the document, entitled "Single Radio Voice Call Continuity (SRVCC); Stage 2 (Release 9)", which is incorporated herein by reference.

At step 2.3, the E-UTRAN 22 and the UTRAN/GERAN 12 networks initiate the handover procedures for transferring a voice component of the voice-and-multimedia communications session to the UTRAN/GERAN 12. The MSC-Server 14 is informed about the triggered handover, which then initiates a session transfer procedure in relation to the voice component of the voice-and-multimedia communications session. Without limitation, the MSC server 14 can utilize Session Description Protocol (SDP) for bidirectional speech in the Session Initiation Protocol (SIP) invitation message, to transfer the voice component of the voice-and-multimedia communications session. Further examples of a session transfer procedure have been described in the document, entitled "IP Multimedia (IM) Core Network (CN) subsystem IP Multimedia Subsystem (IMS) service continuity; Stage 3", and the document, entitled "IP Multimedia Subsystem (IMS) Service Continuity; Stage 2", which are incorporated herein by reference.

In response to receiving a notification relating to session transfer of the voice component, the SCC AS 30 updates the voice-and-multimedia communications session related to the UE 10 to voice only, and updates remote parties, if any, associated with the voice-and-multimedia communications session.

In response to successful remote party (or remote leg) update, the voice component of the voice-and-multimedia communications session is successfully transferred to the UTRAN/GERAN 12 (step 2.5).

Although the voice component of the voice-and-multimedia communications session, or voice-and-multimedia call, is successfully transferred to the UTRAN/GERAN 12, the UE 10b has no means of restoring the multimedia capabilities of the voice-and-multimedia communications session in the UTRAN/GERAN 12, other than terminating the transferred session and establishing a new voice-and-multimedia communications session. Such reestablishment of the voice-and-multimedia communications session may be prone to delays and may even require user intervention, thereby deteriorating the user experience.

In this embodiment of the invention, there is provided for the transfer of all, or some, components relating to a given voice-and-multimedia communications session from a first radio access network to a second radio access network. The arrangement, according to this embodiment of the invention, responsive to the handover of the voice-and-multimedia communications session belonging to a communications instance from the E-UTRAN 22 to the UTRAN/GERAN 12, the UE 10 may send a first message to a recipient node, such as a UTRAN/GERAN 10 MSC associated with the US 10b, to provide a second voice-and-multimedia communications session in said second radio access network, to further continue said communications instance. As will be appreciated, the MSC server 14 may also be the recipient node. Therefore, according to this embodiment of the invention, the UE 10 initiates procedure for provision of a second voice-and multimedia communications session in response to an indication that the handover is complete, thereby reducing delays in session setup thus improving user experience compared to the legacy mechanisms.

Per an arrangement, the UE 10b can be configured to trigger sending the first message in response to receiving a predetermined message from the UTRAN/GERAN 12. The predetermined message may comprise instructions relating to the handover of the voice-and-multimedia communications session from the E-UTRAN 22 to the UTRAN/GERAN 12.

The UE 10b could be alternatively configured to send the first message in response to sending a further predetermined message to the UTRAN/GERAN 12. The further predetermined message may indicate completion of the handover of the voice-and-multimedia communications session from the E-UTRAN 22 to the UTRAN/GERAN 12.

In accordance with a further arrangement, such as where the handover of the voice-and-multimedia communications session from the E-UTRAN 22 to the UTRAN/GERAN 12 is accomplished using the SRVCC procedures, the further predetermined message is a SRVCC handover complete message.

As will be appreciated, the UE 10*b* can be configured to trigger sending the first message without user intervention. The first message may further comprise a predefined Session Transfer Number (STN). A Session Transfer Number Single Radio (STN-SR), received during the SRVCC handover of the voice component of the voice-and-multimedia communications session, may be utilised as the STN of the first message.

In response to the successful transfer of the voice component of the voice-and-multimedia communications session, the UE 10*b* triggers the setup of a second voice-and-multimedia communications session to its associated mobility controller, or a mobile switching centre, in the UTRAN/GERAN 12.

In an arrangement, such as where the mobility controller associated with the UE 10*b* does not support Service Change and UDI/RDI Fallback (SCUDIF), the UE 10*b* establishes a new voice-and-multimedia communications session utilizing session transfer procedures, which may include a Session Transfer number (STN).

In a further arrangement, such as where the mobility controller associated with the UE 10*b* does support (SCUDIF), the first message further comprises bearer capability (BC) parameters to the mobility controller (step 2.6). The first message may comprise more than one BC parameters, such as BC1 and BC2. The BC parameters indicate a type of session requested. The type of session is indicated by means of a B channel type. In addition to the bearer capability parameters, the first message may further comprise a repeat indicator (RI) indicating allowability of changes between the requested session types during provisioning of the second voice-and-multimedia communications session.

The reception of the first message comprising the BC parameters causes the mobility controller to assess the UTRAN/GERAN's 12 capability of supporting the second voice-and-multimedia communications session. In the event that the second voice-and-multimedia communications session is incompatible with the capability of the UTRAN/GERAN 12, the UE 10*b* abandons establishment of the second voice-and-multimedia communications session, to continue said communications instance.

In the event that the second voice-and-multimedia communications session is compatible with the capability of the UTRAN/GERAN 12, the mobility controller transmits a second message requesting establishment of the second voice-and-multimedia communications session to a session transfer controller, such as the SCC AS 30 (step 2.7). The request for the establishment of the second voice-and-multimedia communications session identifies the desired multimedia components for the call, such as voice and video.

In the event that the MSC of the UTRAN/GERAN 12 supports SCUDIF, the MSC transmits a SIP Invite message to the SCC AS 30, and specifies the desired multimedia components in the session description, such as voice and video.

In response to receiving the request for establishment of the second voice-and-multimedia communications session, the SCC-AS 30 provides a second voice-and-multimedia communications session in said second radio access network to continue said communications instance. An example of establishing a voice-and-multimedia communications session has been described in the document, entitled "Technical realization of Circuit Switched (CS) multimedia service; UDI/RDI fallback and service modification; Stage 2", which is incorporated herein by reference.

The second voice-and-multimedia communications session is correlated with the transferred voice component of the handed over voice-and-multimedia communications session. The effect of correlation is such that a remote party associated with the communications instance does not realise the effects of the establishment of the second voice-and-multimedia communications session, and that the first and second voice-and-multimedia communications session of the communications instance appear as a single voice-and-multimedia communications session to the remote party.

The SCC-AS may correlate the first and second voice-and-multimedia communications sessions of the communications instance on the basis of the STN associated with the first and second voice-and-multimedia communications sessions or a Correlation Mobile Subscriber Integrated Services Digital Network Number (C-MSISDN). An exemplary method of correlating assigns a STN corresponding to the voice communications session of the communications instance to the second voice-and-multimedia communications session.

In response to successful establishment of the second voice-and-multimedia communications session, the SCC-AS updates the remote party in relation to the changes due to the establishment of the second voice-and-multimedia communications session, and updates session characteristics of the communications instance to voice and multimedia. Without limitation, the multimedia includes video.

It will be appreciated that the UE 10*b* is configured to simultaneously participate in the voice component of the voice-and-multimedia communications session and the second voice-and-multimedia communications session.

In accordance with an alternate arrangement, the UE 10*b* terminates the handed over voice-and-multimedia communications session, in response to the successful establishment of the second voice-and-multimedia communications session. As will be appreciated, the SCC AS may also terminate the handed over voice-and-multimedia communications session by following the source access leg release procedure described in the document, entitled "IP Multimedia Subsystem (IMS) Service Continuity; Stage 2", after successfully establishing the second voice-and-multimedia communications session (step 2.9).

The UE 10*b* then has an active voice-and-multimedia communications session, and that the multimedia capabilities of the communications instance are restored.

Figure 3:
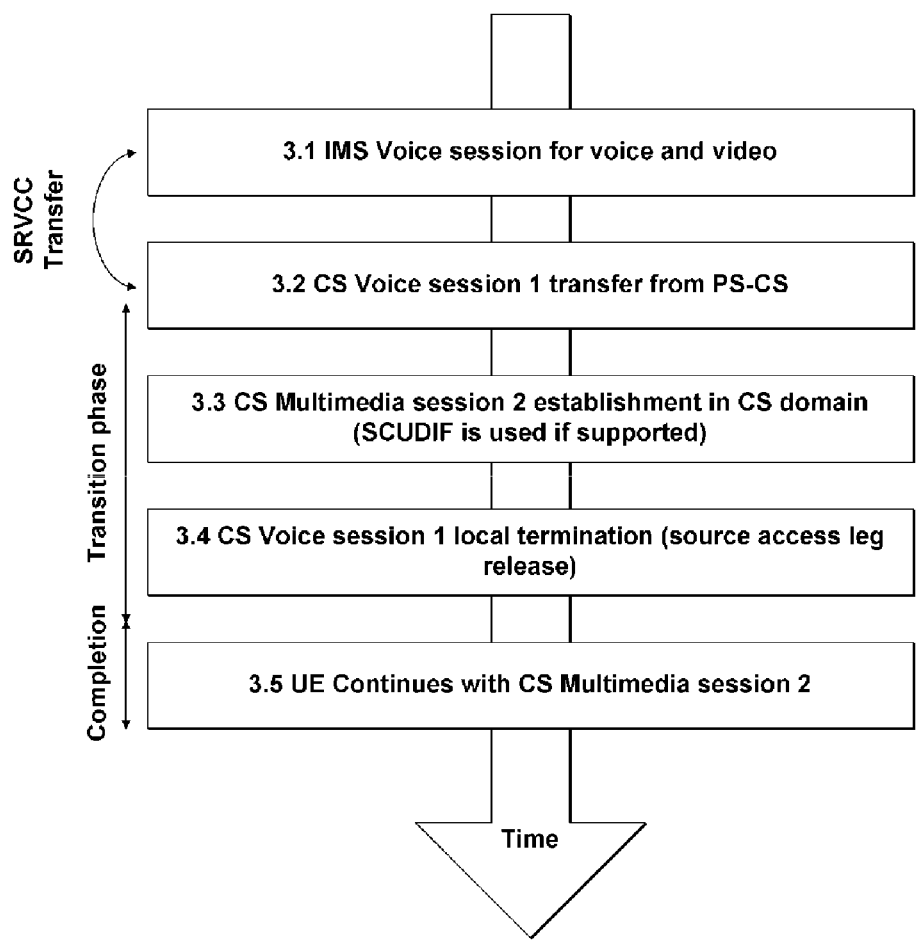
FIG. 3 is a flow diagram illustrating an embodiment of the invention.

FIG. 3 illustrates an embodiment of the invention where a handover of a voice-and-multimedia communications session on a UE 10*b* is accomplished using SRVCC procedures, and the establishment of the second voice-and-multimedia communications session is accomplished using SCUDIF procedures. As described above, an active voice-and-multimedia communications session is transferred from the E-UTRAN 22 to the UTRAN/GERAN 12 as a voice communications session only. Steps 3.1 and 3.2 of the FIG. 3 illustrate the establishment and transfer of the voice component of the voice-and-video communications session.

In response to the successful transfer of the voice component, the UE 10*b* initiates the procedure for establishing the second voice-and-multimedia communications session.

In an arrangement, such as where the MSC of the UTRAN/GERAN 12 supports SCUDIF modify procedure, the UE 10*b* transmits a SCUDIF modify message comprising BC parameters for desired a session type to the MSC. In response to receiving the modify message, the MSC verifies the compatibility of the requested session type with the capabilities of the UTRAN/GERAN 12, and in the event that they are compatible, the MSC updates the session type and notifies the SCC AS 30 of the change. The SCC AS 30 may in turn notify the changes to any remote parties associated with the communications instance. The successful update restores the multimedia capabilities of the communications instance.

In an alternate arrangement, the UE 10b sends a SCUDIF setup message comprising the BC parameters and the RI, which is then processed by the MSC and the SCC AS 30 if SCUDIF is supported by the UTRAN/GERAN 12, per the procedures described above (steps 3.3).

In response to successful establishment of the second voice-and-multimedia communications session, the SCC AS 30 is arranged to control the first and the second voice-and-multimedia communications sessions of the communications instance simultaneously.

As discussed above, the UE 10b continues with the second voice-and-multimedia communications session (step 3.5) and terminates the first voice-and-multimedia communications session that was reduced to voice component only (step 3.4).

As will be appreciated, the UE 10, per the invention, is configured to trigger establishment of a second voice-and-multimedia communications session when a first voice-and-multimedia communications session of a communications instance has been limited to voice communications session. The limitation may have arisen due to a handover between a packet switched network to a circuit switched network. The UE 10 is also configured to manage active communications instances by terminating a first communications sessions in a given communications instance that has been superseded by a second communications session, where the second communications session incorporates the capabilities of the first communications session. For example, terminating a voice communications session when a voice and video communications session relating to the same communications instance has been established.

As will also be appreciated, the correlation of the communications sessions relating to a communications instance by the SCC AS 30 enables restoration of multimedia capabilities of a communications instance and ensuring that minimal effects relating to changes to the communications instance are experienced by a remote party. As discussed above, the correlation can be achieved by assigning the STN-SR of a SRVCC transferred voice session as the STN of a requested second voice-and-multimedia communications session. The correlation can also be based on the C-MSISDN associated with the UE 10.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A user equipment for performing a handover from a first radio access network to a second radio access network, the first radio access network supporting packet switched communications and the second radio access network supporting circuit switched communications, the user equipment comprising:

a controller configured to participate in a first voice-and-multimedia communications session in the first radio access network, the first voice-and-multimedia communications session comprises a voice communications component and a multimedia communications component, during handover from the first radio access network to the second radio access network, to transfer the voice communications component from the first radio access network to the second radio access network, and responsive to the handover, to send a first message to a node of the second radio access network to provide a second voice-and-multimedia communications session in the second radio access network, to continue the first voice-and-multimedia communications session.

2. The user equipment according to claim 1, wherein the controller is configured to trigger sending of the first message in response to receiving a predetermined message from the second radio access network, the predetermined message comprising instructions relating to said handover.

3. The user equipment according to claim 1, wherein the controller is configured to trigger sending of the first message in response to sending a predetermined message to the second radio access network, the predetermined message indicating completion of said handover.

4. The user equipment according to claim 3, wherein the predetermined message is a Single Radio Voice Call Continuity (SRVCC) handover complete message.

5. The user equipment according to claim 1, wherein the controller is configured to trigger sending of the first message without user intervention.

6. The user equipment according to claim 1, wherein the first message comprises a predefined Session Transfer Number (STN).

7. The user equipment according to claim 6, wherein a Session Transfer Number Single Radio (STN-SR) is the STN of the first message, the STN-SR being received during the transfer of said voice communications session.

8. The user equipment according to claim 1, wherein the controller is configured to simultaneously participate in said voice communications session and said second voice-and-multimedia communications session in said second radio access network.

9. The user equipment according to claim 1, wherein the controller is configured to terminate said voice communications session in response to said second voice-and-multimedia communications session being established in said second radio access network.

10. The user equipment according to claim 1, wherein the user equipment has a single radio interface for communicating with the first wireless network and the second wireless network, such that a radio connection with the first wireless network must be broken before a radio connection with the second wireless network is made when participating in said handover.

11. The user equipment according to claim 1, wherein the handover comprises Single Radio Voice Call Continuity (SRVCC) procedures.

12. The user equipment according to claim 1, wherein sending of the first message causes the node to assess the second radio access network's capability of supporting the second voice-and-multimedia communications session, and in the event that the second voice-and-multimedia communications session is compatible with the capability of the second radio access network, the node to transmit a second message requesting establishment of the second voice-and-multimedia communications session to a session transfer controller.

13. The user equipment according to claim 12, wherein, in the event that the second voice-and-multimedia communications session is incompatible with the capability of the second radio access network, the user equipment abandons establishment of the second voice-and-multimedia communications session.

14. The user equipment according to claim 1, wherein the establishment of the second voice-and-multimedia communications session comprises Service Change for Unrestricted Digital Information (UDI) Fallback (SCUDIF) procedures.

15. The user equipment according to claim 1, wherein said first message comprises at least two bearer capability parameters indicating at least two requested session types, the session type being a bearer channel type.

16. The user equipment according to claim 15, wherein said first message comprises a Repeat Indicator (RI) indicating allowability of changes between at least two requested session types during provisioning of said second voice-and-multimedia communications session.

17. The user equipment according to claim 15, wherein the second radio access network's capability of supporting the second voice-and-multimedia communications session is determined on the basis of at least two bearer capability parameters in the first message.

18. A handover method of a user equipment from a first radio access network to a second radio access network, the first radio access network supporting packet switched communications and the second radio access network supporting circuit switched communications, the method comprising:
    participating in a first voice-and-multimedia communications session in said first radio access network, the communications session comprises a voice communications component and a multimedia communications component;
    during handover from the first radio access network to the second radio access network, transferring the voice communications component from the first radio access network to the second radio access network; and
    responsive to the handover, sending a first message to a node of the second radio access network to provide a second voice-and-multimedia communications session in the second radio access network, to continue the first voice-and-multimedia communications session.

19. The method according to claim 18, further comprising: triggering sending of the first message in response to receiving a predetermined message from the second radio access network, the predetermined message comprising instructions relating to said handover.

20. The method according to claim 18, further comprising: triggering sending of the first message in response to sending a predetermined message to the second radio access network, the predetermined message indicating completion of said handover.

21. The method according to claim 20, wherein the predetermined message is a Single Radio Voice Call Continuity (SRVCC) handover complete message.

22. The method according to claim 18, further comprising: triggering sending of the first message without user intervention.

23. The method according to claim 18, wherein the first message comprises a predefined Session Transfer Number (STN).

24. The method according to claim 23, wherein a Session Transfer Number Single Radio (STN-SR) is the STN of the first message, the STN-SR being received during the transfer of said voice communications session.

25. The method according to claim 18, further comprising:
    simultaneously participating in said voice communications session and said second voice-and-multimedia communications session in said second radio access network.

26. The method according to claim 18, further comprising:
    terminating said voice communications session in response to said second voice-and-multimedia communications session being established in said second radio access network.

27. The method according to claim 18, wherein the user equipment has a single radio interface for communicating with the first wireless network and the second wireless network, such that a radio connection with the first wireless network must be broken before a radio connection with the second wireless network is made when participating in said handover.

28. The method according to claim 18, wherein the handover comprises Single Radio Voice Call Continuity (SRVCC) procedures.

29. The method according to claim 18, wherein sending of the first message causes the node to assess the second radio access network's capability of supporting the second voice-and-multimedia communications session, and in the event that the second voice-and-multimedia communications session is compatible with the capability of the second radio access network, the node to transmit a second message requesting establishment of the second voice-and-multimedia communications session to a session transfer controller.

30. The method according to claim 29, wherein, in the event that the second voice-and-multimedia communications session is incompatible with the capability of the second radio access network, the user equipment abandons establishment of the second voice-and-multimedia communications session.

31. The method according to claim 18, wherein the establishment of the second voice-and-multimedia communications session comprises Service Change for Unrestricted Digital Information (UDI) Fallback (SCUDIF) procedures.

32. The method according to claim 18, wherein said first message comprises at least two bearer capability parameters indicating at least two requested session types, the session type being a bearer channel type.

33. The method according to claim 32, wherein said first message comprises a Repeat Indicator (RI) indicating allowability of changes between at least two requested session types during provisioning of said second voice-and-multimedia communications session.

34. The method according to claim 32, wherein the second radio access network's capability of supporting the second voice-and-multimedia communications session is determined on the basis of the at least two bearer capability parameters in the first message.

* * * * *